United States Patent
LeBlanc et al.

(10) Patent No.: US 10,132,179 B2
(45) Date of Patent: Nov. 20, 2018

(54) ALIGNMENT TOOL FOR USE IN A GAS TURBINE ENGINE

(71) Applicant: UNITED TECHNOLOGIES CORPORATION, Hartford, CT (US)

(72) Inventors: Ryan Edward LeBlanc, Glastonbury, CT (US); Kevin J. Cummings, West Hartford, CT (US); Christopher St. Mary, Hebron, CT (US); Donald A. Hill, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 925 days.

(21) Appl. No.: 14/426,995

(22) PCT Filed: Feb. 15, 2013

(86) PCT No.: PCT/US2013/026298
§ 371 (c)(1),
(2) Date: Mar. 10, 2015

(87) PCT Pub. No.: WO2014/051663
PCT Pub. Date: Apr. 3, 2014

(65) Prior Publication Data
US 2017/0321563 A1 Nov. 9, 2017

Related U.S. Application Data

(60) Provisional application No. 61/707,098, filed on Sep. 28, 2012.

(51) Int. Cl.
*F01D 9/04* (2006.01)
*F01D 25/28* (2006.01)
(Continued)

(52) U.S. Cl.
CPC ............ *F01D 9/042* (2013.01); *B25B 1/00* (2013.01); *B25B 3/00* (2013.01); *F01D 17/162* (2013.01);
(Continued)

(58) Field of Classification Search
CPC ...... F01D 9/042; F01D 25/28; F01D 2230/60; F01C 7/20; B25B 1/00; B25B 3/00; B25B 5/00; Y10T 29/53909; Y10T 29/49346
(Continued)

(56) References Cited

U.S. PATENT DOCUMENTS 2,393,795 A * 1/1946 Miller ............... B25B 27/16
254/100
3,845,538 A * 11/1974 Demler, Sr. ........ B25B 27/16
29/234
(Continued)

FOREIGN PATENT DOCUMENTS

EP 1010863 B1 7/2006
EP 2299064 A2 3/2011

OTHER PUBLICATIONS

International Search Report and Written Opinion of the International Searching Authority for International application No. PCT/US2013/026298 dated Jun. 21, 2013.

*Primary Examiner* — Bayan Salone
(74) *Attorney, Agent, or Firm* — Carlson, Gaskey & Olds, P.C.

(57) ABSTRACT

An alignment tool for use in a gas turbine engine according to an exemplary aspect of the present disclosure includes, among other things, a clamp portion, a component engagement portion and an arm portion that extends between the clamp portion and the component engagement portion. The
(Continued)

clamp portion establishes a fixed datum surface for positioning a component within the gas turbine engine.

20 Claims, 5 Drawing Sheets

(51) Int. Cl.
*F01D 17/16* (2006.01)
*F02C 7/20* (2006.01)
*B25B 1/00* (2006.01)
*B25B 3/00* (2006.01)
*B25B 5/00* (2006.01)

(52) U.S. Cl.
CPC ........... *F01D 25/28* (2013.01); *F01D 25/285* (2013.01); *B25B 5/00* (2013.01); *F02C 7/20* (2013.01); *F05D 2230/60* (2013.01); *Y10T 29/49346* (2015.01)

(58) Field of Classification Search
USPC ................... 29/271, 890.01; 269/3, 6, 43, 95
See application file for complete search history.

(56) References Cited

U.S. PATENT DOCUMENTS

| | | | |
|---|---|---|---|
| 4,767,264 A | 8/1988 | Kisling et al. | |
| 4,979,874 A * | 12/1990 | Myers | F01D 7/00 |
| | | | 415/160 |
| 5,438,756 A | 8/1995 | Halchak et al. | |
| 5,549,448 A | 8/1996 | Langston | |
| 5,586,378 A * | 12/1996 | Smith | B25B 27/023 |
| | | | 269/249 |
| 5,601,401 A | 2/1997 | Matheny et al. | |
| 6,839,979 B1 | 1/2005 | Godbole et al. | |
| 6,842,995 B2 | 1/2005 | Jones et al. | |
| 6,883,224 B2 | 4/2005 | Thomas | |
| 7,011,494 B2 * | 3/2006 | Kies | F01D 17/162 |
| | | | 415/148 |
| 7,226,066 B2 | 6/2007 | Ichihara et al. | |
| 7,273,348 B2 | 9/2007 | Amitharajah et al. | |
| 8,142,150 B2 | 3/2012 | Frick et al. | |
| 8,151,422 B2 | 4/2012 | Durocher et al. | |
| 8,215,902 B2 * | 7/2012 | Major | F01D 17/162 |
| | | | 29/889.22 |
| 2009/0000453 A1 | 1/2009 | Fisk | |
| 2009/0074569 A1 | 3/2009 | Garcin et al. | |

\* cited by examiner

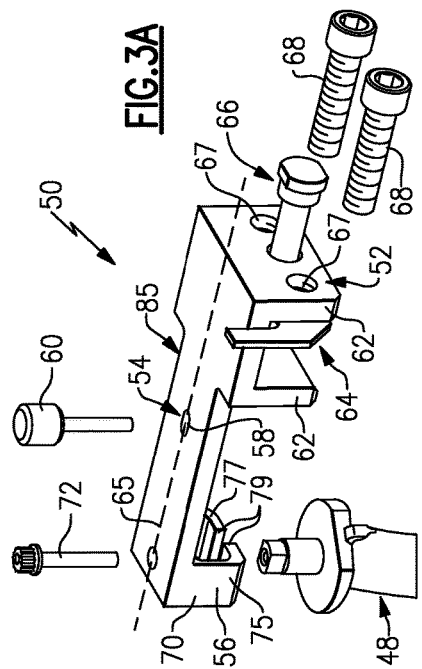
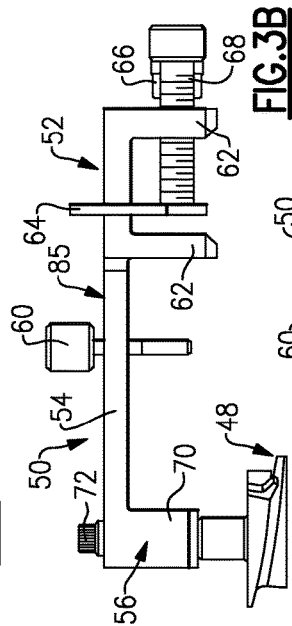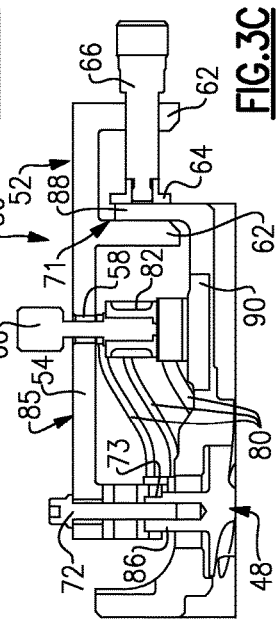
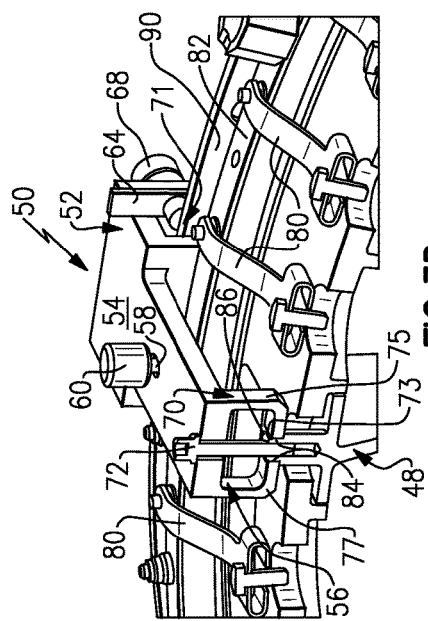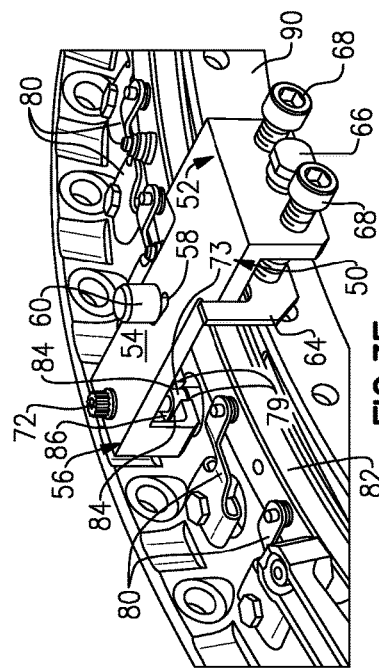

ALIGNMENT TOOL FOR USE IN A GAS TURBINE ENGINE

CROSS-REFERENCE TO RELATED APPLICATION

This application claims priority to U.S. Provisional Application Ser. No. 61/707,098, which was filed on Sep. 28, 2012.

BACKGROUND

This disclosure relates to a gas turbine engine, and more particularly to an alignment tool that can be used to align and install a component of a gas turbine engine.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of the gas turbine engine typically include alternating rows of rotating blades and stationary vanes. The rotating blades either create or extract energy from the hot combustion gases that are communicated through the gas turbine engine, and the vanes convert the velocity of the airflow into pressure and prepare the airflow for the next set of blades.

Some stages of the gas turbine engine may include variable vanes. Variable vanes can be rotated between a variety of angular positions to improve efficiency, reliability and power output of the gas turbine engine. Each variable vane may be mounted to a synchronizing ring that is moveable to influence the positioning of each variable vane.

A rigging procedure may be performed to establish the vane angle of the variable vane relative to the synchronizing ring and/or other components of a variable vane system. There may be a need to align the variable vanes to some known points during the rigging procedure. Current tools used during rigging procedures have not effectively achieved this desired alignment and can be susceptible to human error.

SUMMARY

An alignment tool for use in a gas turbine engine according to an exemplary aspect of the present disclosure includes, among other things, a clamp portion, a component engagement portion and an arm portion that extends between the clamp portion and the component engagement portion. The clamp portion establishes a fixed datum surface for positioning a component within the gas turbine engine.

In a further non-limiting embodiment of the foregoing alignment tool, the clamp portion includes a pair of spaced apart clamp arms.

In a further non-limiting embodiment of either of the foregoing alignment tools, a backing plate is between the pair of spaced part clamp arms.

In a further non-limiting embodiment of any of the foregoing alignment tools, the backing plate is moveably positioned between the pair of spaced apart clamp arms by a capture pin.

In a further non-limiting embodiment of any of the foregoing alignment tools, the component engagement portion includes an engagement claw.

In a further non-limiting embodiment of any of the foregoing alignment tools, the engagement claw includes a first claw arm and a second claw arm spaced from the first claw arm.

In a further non-limiting embodiment of any of the foregoing alignment tools, a fastener extends through the component engagement portion and engages a trunion of the component.

In a further non-limiting embodiment of any of the foregoing alignment tools, the arm portion includes a slotted opening.

In a further non-limiting embodiment of any of the foregoing alignment tools, a pin is received though the slotted opening to position the arm portion relative to a synchronizing ring.

In a further non-limiting embodiment of any of the foregoing alignment tools, the clamp portion is clamped to a casing of the gas turbine engine and the component engagement portion engages the component of the gas turbine engine.

In a further non-limiting embodiment of any of the foregoing alignment tools, the component engagement portion extends perpendicularly from the arm portion.

In a further non-limiting embodiment of any of the foregoing alignment tools, an engagement claw of the component engagement portion extends parallel to a clamp arm of the clamp portion.

A method of installing a component into a portion of a gas turbine engine according to another aspect of the present disclosure includes, among other things, positioning an alignment tool relative to a casing of the portion of the gas turbine engine and aligning an engagement portion of the alignment tool relative to the component.

In a further non-limiting embodiment of the foregoing method, the method includes the step of removing a vane arm from the portion prior to the steps of positioning and aligning.

In a further non-limiting embodiment of either of the foregoing methods, the step of aligning the engagement portion includes engaging flats of a trunion of the component with an engagement claw of the engagement portion.

In a further non-limiting embodiment of any of the foregoing methods, the method includes the step of installing a fastener through the engagement portion and into the component.

In a further non-limiting embodiment of any of the foregoing methods, the method includes the steps of rotating a synchronizing ring of the portion of the gas turbine engine, aligning a hole of the synchronizing ring with a slotted opening of the alignment tool and installing a pin through the hole and the slotted opening.

In a further non-limiting embodiment of any of the foregoing methods, the method includes the step of positioning additional components relative to the synchronizing ring subsequent to the steps of rotating, aligning the hole of the synchronizing ring, and installing.

In a further non-limiting embodiment of any of the foregoing methods, the step of positioning includes sandwiching the casing between a backing plate and a clamp arm of the alignment tool.

In a further non-limiting embodiment of any of the foregoing methods, the alignment tool includes a clamp portion that establishes a fixed datum surface for positioning the alignment tool within the gas turbine engine.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 3A, 3B, 3C, 3D and 3E illustrate an alignment tool that can be used to position a component within a gas turbine engine.

DETAILED DESCRIPTION

Figure 1:
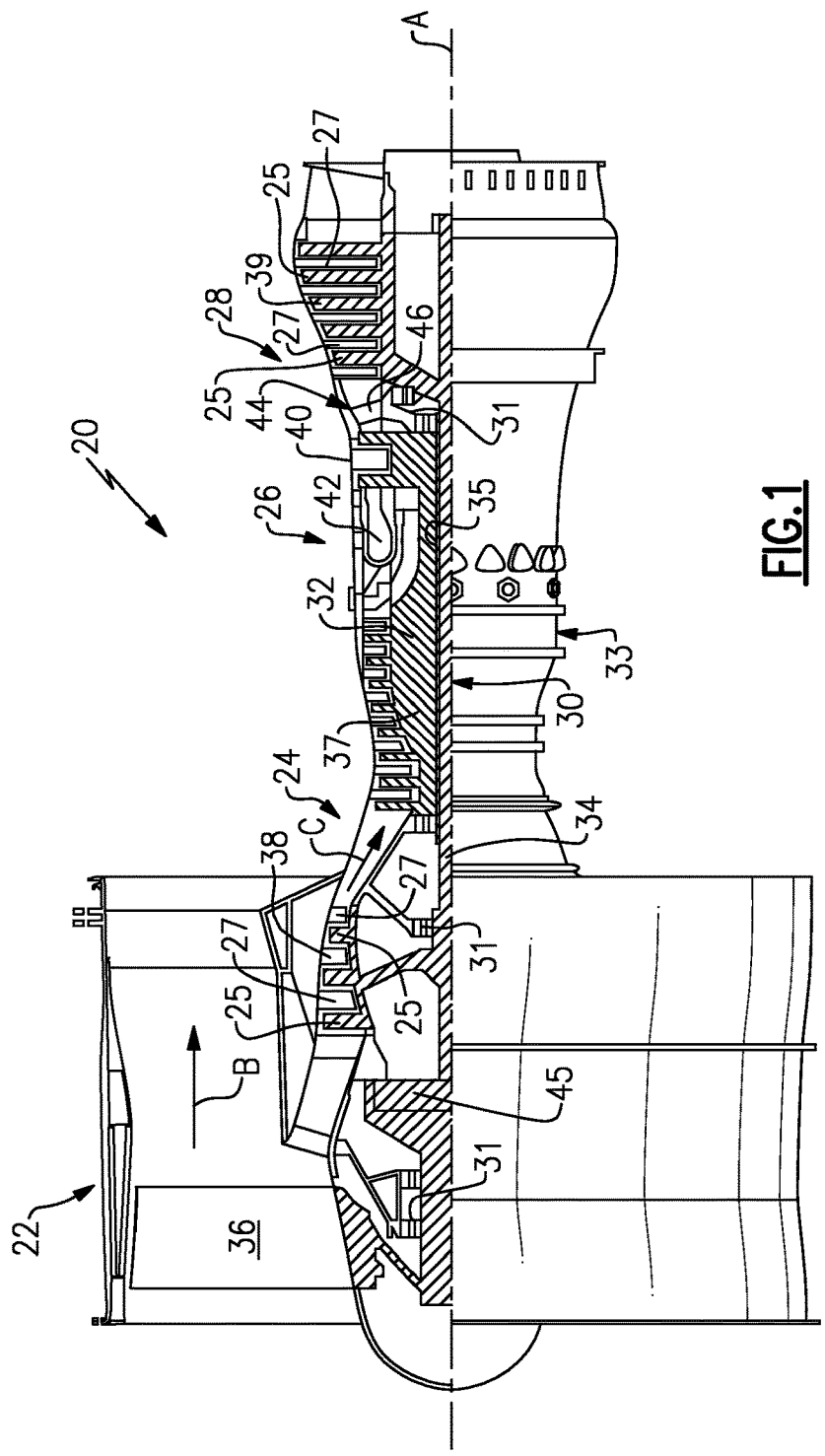
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmentor section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds, which can increase the operational efficiency of the low pressure compressor 38 and low pressure turbine 39 and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In one embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °\ R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2:
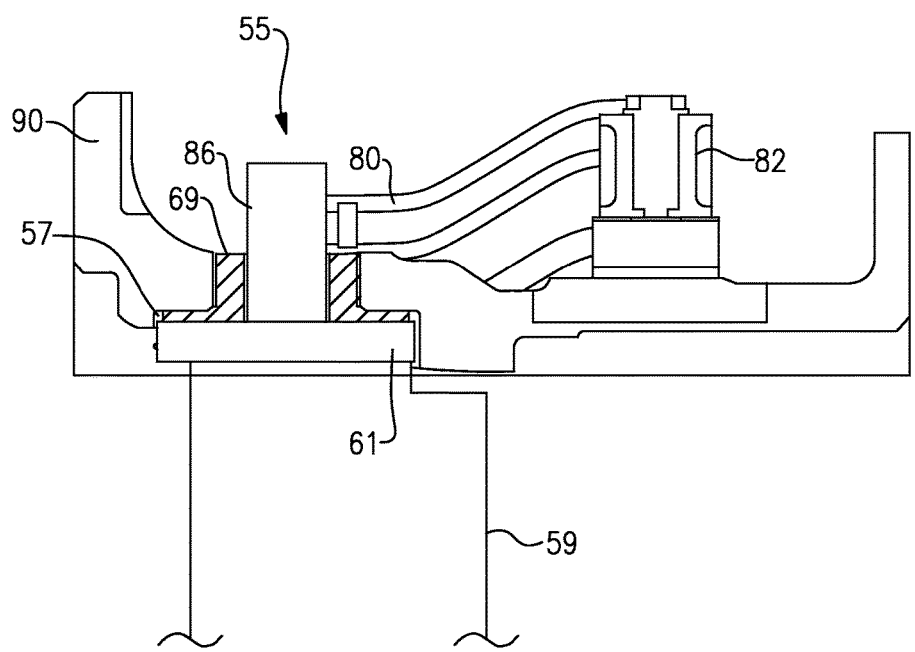
FIG. 2 illustrates a variable vane assembly.

A portion of the stages of either the compressor section 24 or the turbine section 28 may include variable vanes. For example, FIG. 2 illustrates a variable vane assembly 55 that could be incorporated into the compressor section 24 and/or the turbine section 28 of the gas turbine engine 20. The variable vane assembly 55 may be mounted within an opening 57 of a casing 90, such as an outer casing of the engine static structure 33. The variable vane assembly 55 can include an airfoil 59, a platform 61 and a trunion 86. The trunion 86 extends into the opening 57 and is attached to a vane arm 80 that connects the variable vane assembly 55 to a synchronizing ring 82. One or more bearings 69 can be positioned between the variable vane assembly 55 and the casing 90. The radially inner side (not shown) of the variable vane assembly 55 could include a similar configuration for rotatably mounting the variable vane assembly 55 to an inner casing of the engine static structure 33.

The angular positioning or pitch of the airfoil 59 of the variable vane assembly 55 can be altered relative to the engine centerline longitudinal axis A (see FIG. 1) by actuating the synchronizing ring 82. Movement of the synchronizing ring 82 is transmitted to the vane arm 80 and is subsequently transmitted to rotate the trunion 86 within the opening 57, thereby altering the angular positioning of the airfoil 59. An alignment tool that can be utilized to position a variable vane or some other component of the gas turbine engine 20 to achieve such a variable arrangement is discussed in detail below.

FIGS. 3A, 3B, 3C, 3D and 3E illustrate an exemplary alignment tool 50 that can be used to align and position one or more components 48 of a gas turbine engine, such as the gas turbine engine 20 of FIG. 1. In this embodiment, the component 48 is a variable vane and the alignment tool 50 is used to accurately align and position the variable vane within the gas turbine engine 20, such as within the compressor section 24 and/or the turbine section 28. However, it should be understood that the alignment tool 50 could be used as part of a rigging procedure to align, position and/or assemble any component 48 of the gas turbine engine 20. In this disclosure, the term "rigging procedure" may refer to the procedure for setting the vane angle of a variable vane relative to a synchronizing ring (and actuator) that can be positioned within the gas turbine engine 20 and are operable to influence an angular positioning of each variable vane.

The alignment tool 50 can include a tool body 85 having a clamp portion 52, an arm portion 54 that extends from the clamp portion 52, and a component engagement portion 56. In this embodiment, the arm portion 54 generally extends between the clamp portion 52 and the component engagement portion 56 along a longitudinal axis 65 (see FIG. 3A). In one embodiment, the component engagement portion 56 extends perpendicularly from the arm portion 54 and the clamp portion 52 extends from the arm portion 54 in a direction that is parallel to the component engagement portion 56.

The clamp portion 52 of the alignment tool 50 may include a pair of spaced apart clamp arms 62 and a flange backing plate 64 positioned between the clamp arms 62. The clamp arms 62 are generally parallel to one another. The flange backing plate 64 is moveably positionable between the clamp arms 62 by a capture pin 66 to sandwich a flange 88 of a casing 90 and secure the alignment tool 50 for use (see FIG. 3C). As discussed in greater detail below, the clamp portion 52 may provide a datum surface 71 (see FIGS. 3C and 3D) that establishes a fixed reference point for accurately positioning the alignment tool 50 for use to position one or more components 48 within the gas turbine engine 20. The capture pin 66 may be screwed into the flange backing plate 64, in one embodiment (see FIG. 3C). Fasteners 68 may be used to maintain a position of the flange backing plate 64 between the clamp arms 62. The fasteners 68 may be inserted through openings 67 that extend through at least one of the clamp arms 62 (see FIG. 3A).

The component engagement portion 56 of the alignment tool 50 can include an engagement claw 70 for engaging a portion of the component 48. A bolt or other fastener 72 can extend through the component engagement portion 56 and contact the component 48. In one embodiment, the engagement claw 70 of the component engagement portion 56 engages flats 84 of a variable vane stem 73 of the component 48 and the fastener 72 is received within a trunion 86 of the component 48 (best illustrated in FIGS. 3C, 3D and 3E).

In one embodiment, the engagement claw 70 of the component engagement portion 56 includes a first claw arm 75 and a second claw arm 77. A space extends between a distal face 79 of each of the first claw arm 75 and the second claw arm 77 for receiving the variable vane stem 73 of the component 48. The distal faces 79 of the first claw arm 75 and the second claw arm 77 can face one another.

The arm portion 54 of the alignment tool 50 can include a slotted opening 58 that can receive a pin 60. The pin 60 can position a synchronizing ring 82 (see FIGS. 3C, 3D and 3E) to which all the other components, including but not limited to vanes and vane arms 80, may be attached for pivotable movement, relative to the alignment tool 50. The exemplary alignment tool 50 provides a simplified set up that relies on a fixed datum surface 71 to establish a relatively high degree of accuracy, thereby reducing error that can occur due to tool misuse when positioning a component 48. Once the proper positioning is achieved, a rigging procedure or some other function may be performed.

Figure 4A:
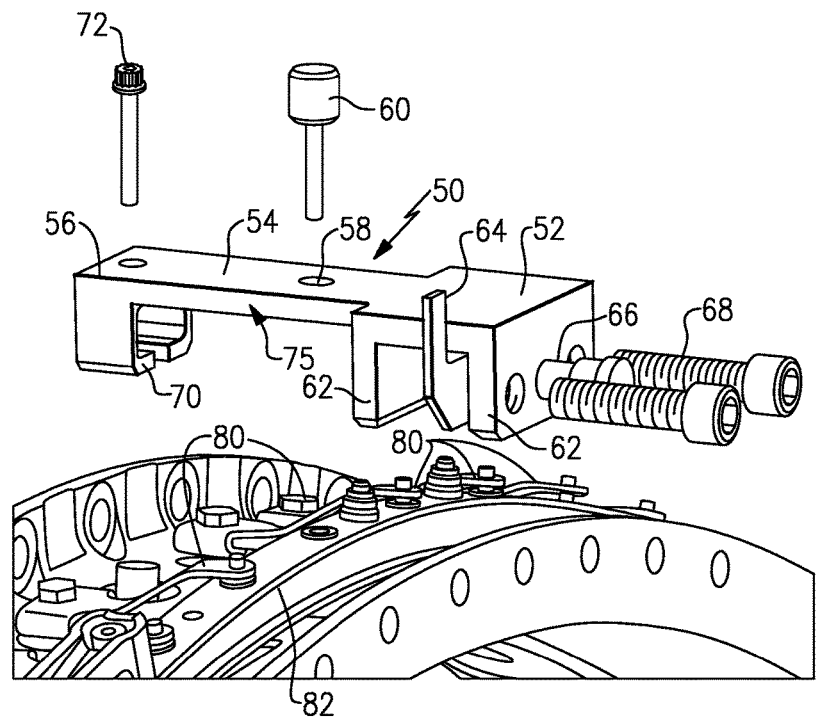
FIGS. 4A, 4B, 4C and 4D schematically illustrate a method of using an exemplary alignment tool to align and install a component within a gas turbine engine.
Figure 4B:
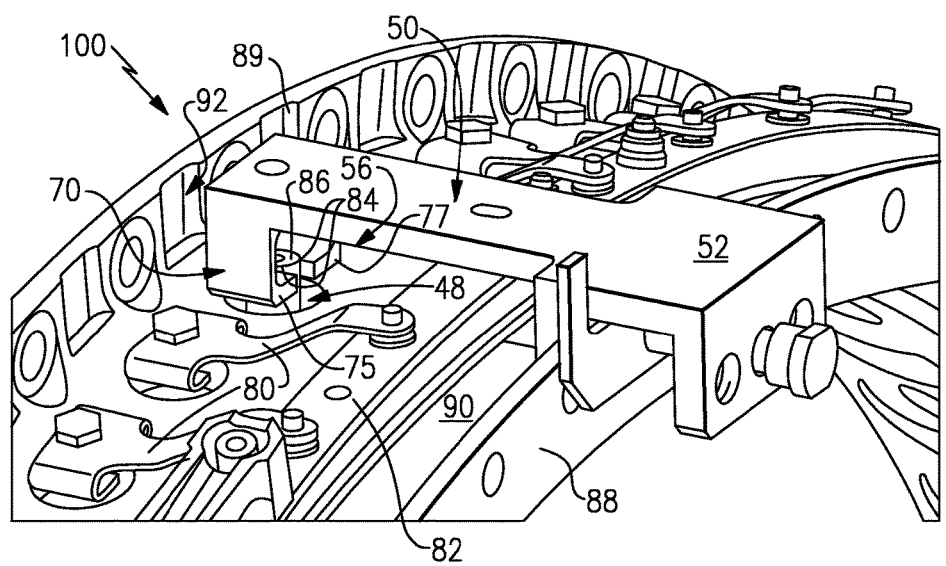

FIGS. 4A, 4B, 4C and 4D, with continued reference to FIGS. 1-3, schematically illustrate one non-limiting method of installing one or more components 48 into a portion 100 of a gas turbine engine 20 using an alignment tool 50. First, as shown in FIG. 4A, a vane arm 80 is removed from the portion 100. The vane arm 80 connects the component 48 to a synchronizing ring 82 (see, for example, FIG. 2). Next, as shown in FIG. 4B, the engagement claw 70 of the component engagement portion 56 of the alignment tool 50 is aligned to flats 84 of a trunion 86 of the component 48 and the clamp portion 52 is guided over a flange 88 of a casing 90 of the portion 100. The flats 84 of the trunion 86 may be received between the first claw arm 75 and the second claw arm 77 of the engagement claw 70. A gap 92 may be maintained between the alignment tool 50 and the forward flange 89 of the casing 90.

Figure 4C:
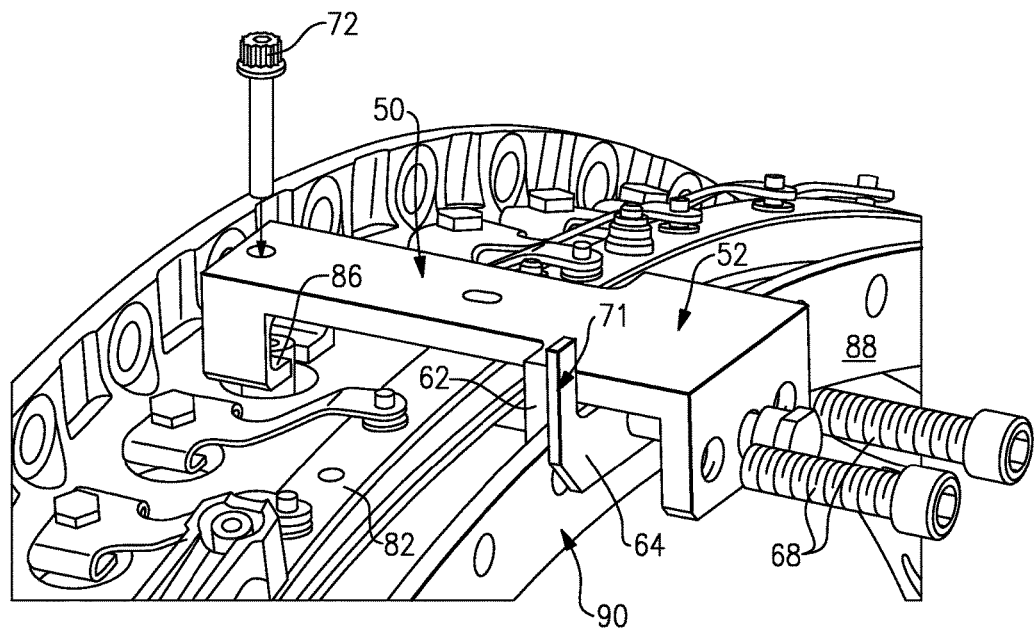

As shown in FIG. 4C, the fastener 72 may be installed through the alignment tool 50 and into the trunion 86. The alignment tool 50 is then aligned as flatly as possible relative to the flange 88. The backing plate 64 and one of the clamp arms 62 may sandwich the flange 88. Once properly aligned, the alignment tool 50 can next be affixed to the casing 90 by tightening down the fasteners 68 and fully seating the fastener 72. In one embodiment, the fastener 72 is torqued to approximately 5-10 inch pound-force (0.565-1.130 Newton Meter) over the running torque. The clamp portion 52 of the alignment tool 50 establishes a fixed datum surface 71 for accurately positioning the alignment tool 50 on the portion 100 of the gas turbine engine 20.

Figure 4D:
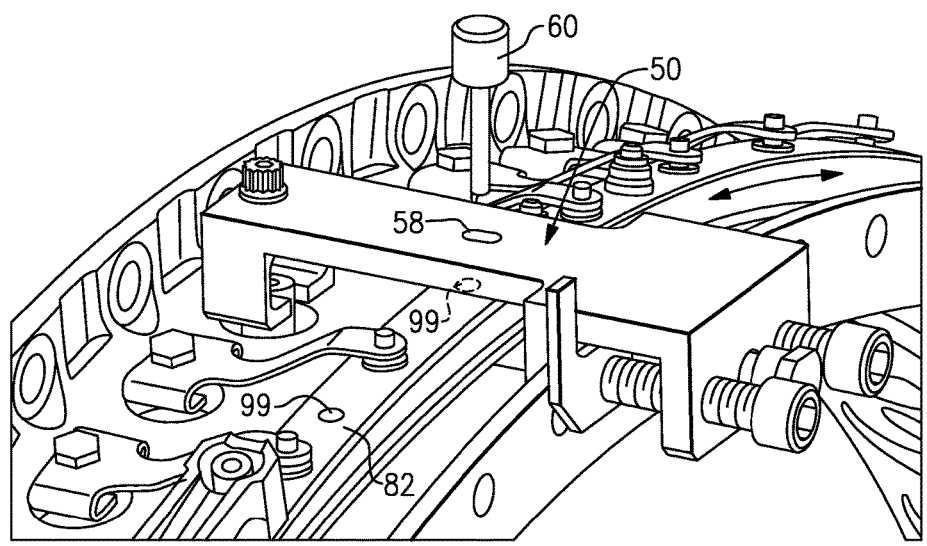

The synchronizing ring 82 can next be rotated circumferentially as shown in FIG. 4D to properly position the synchronizing ring 82 relative to the alignment tool 50. This movement can be accomplished using known tools. When a hole 99 of the synchronizing ring 82 aligns with the slotted opening 58 of the alignment tool 50, the pin 60 can be installed into the hole 99. Once the pin 60 is installed, the alignment tool 50 has affixed the synchronizing ring 82 in proper position and additional components, such as additional variable vanes, may be properly and accurately positioned relative to the synchronizing ring 82.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons the following claims should be studied to determine the true scope and content of this disclosure.

What is claimed is:

1. An alignment tool for use in a gas turbine engine, comprising:
    a clamp portion including a pair of spaced apart clamp arms;
    a backing plate between said pair of spaced apart clamp arms;
    a component engagement portion; and
    an arm portion that extends between said clamp portion and said component engagement portion, wherein said clamp portion establishes a fixed datum surface.

2. The alignment tool as recited in claim 1, wherein said backing plate is moveably positioned between said pair of spaced apart clamp arms by a capture pin.

3. The alignment tool as recited in claim 1, wherein said component engagement portion includes an engagement claw.

4. The alignment tool as recited in claim 3, wherein said engagement claw includes a first claw arm and a second claw arm spaced from said first claw arm.

5. An alignment tool for use in a gas turbine engine, comprising;
    a clamp portion;
    a component engagement portion;
    an arm portion that extends between said clamp portion and said component engagement portion, wherein said clamp portion establishes a fixed datum surface; and
    a fastener that extends through said component engagement portion and engages a trunion of said component.

6. The alignment tool as recited in claim 1, wherein said arm portion includes a slotted opening.

7. An alignment tool use in gas turbine engine, comprising:
    a clamp portion;
    a component engagement portion; and
    an arm portion that extends between said clamp portion and said component engagement portion, wherein said clamp portion establishes a fixed datum surface, and said arm portion includes a slotted opening; and
    a pin that is received though said slotted opening to position said arm portion relative to a synchronizing ring.

8. The alignment tool as recited in claim 1, wherein said clamp portion is clamped to a casing of the gas turbine engine and the component engagement portion engages said component of the gas turbine engine.

9. The alignment tool as recited in claim 1, wherein said component engagement portion extends perpendicularly from said arm portion.

10. The alignment tool as recited in claim 1, wherein an engagement claw of said component engagement portion extends parallel to a clamp arm of said clamp portion.

11. A method of installing a component into a portion of a gas turbine engine, comprising the steps of:
    positioning an alignment tool relative to a casing of the portion of the gas turbine engine;
    aligning an engagement portion of the alignment tool relative to the component; and
    removing a vane arm from the portion prior to the steps of positioning and aligning.

12. The method as recited in claim 11, wherein the step of aligning the engagement portion includes engaging flats of a trunion of the component with an engagement claw of the engagement portion.

13. The method as recited in claim 11, comprising the step of installing a fastener through the engagement portion and into the component.

14. A method of installing a component into a portion of a gas turbine engine, comprising the steps of:
    positioning an alignment tool relative to a casing of the portion of the gas turbine engine;
    aligning an engagement portion of the alignment tool relative to the component;
    rotating a synchronizing ring of the portion of the gas turbine engine;
    aligning a hole of the synchronizing ring with a slotted opening of the alignment tool; and
    installing a pin through the hole and the slotted opening.

15. The method as recited in claim 14, comprising the step of positioning additional components relative to the synchronizing ring subsequent to the steps of rotating, aligning the hole of the synchronizing ring, and installing.

16. A method of installing a component into a portion of a gas turbine engine, comprising the steps of:
    positioning an alignment tool relative to a casing of the portion of the gas turbine engine, wherein the step of positioning includes sandwiching the casing between a backing plate and a clamp arm of the alignment tool; and
    aligning an engagement portion of the alignment tool relative to the component.

17. The method as recited in claim 11, wherein the alignment tool includes a clamp portion that establishes a fixed datum surface for positioning the alignment tool within the gas turbine engine.

18. The method as recited in claim 11, comprising the steps of:
    rotating a synchronizing ring of the portion of the gas turbine engine;
    aligning a hole of the synchronizing ring with a slotted opening of the alignment tool; and
    installing a pin through the hole and the slotted opening.

19. The method as recited in claim 16, comprising the steps of
    rotating a synchronizing ring of the portion of the gas turbine engine;
    aligning a hole of the synchronizing ring with a slotted opening of the alignment tool; and
    installing a pin through the hole and the slotted opening.

20. The alignment tool as recited in claim 7, wherein the clamp portion includes a moveable backing plate.

* * * * *